Aug. 7, 1956  S. G. ESKIN  2,758,177
MULTI ACTION ELECTRICAL THERMOSTAT
Filed March 9, 1955  2 Sheets-Sheet 1
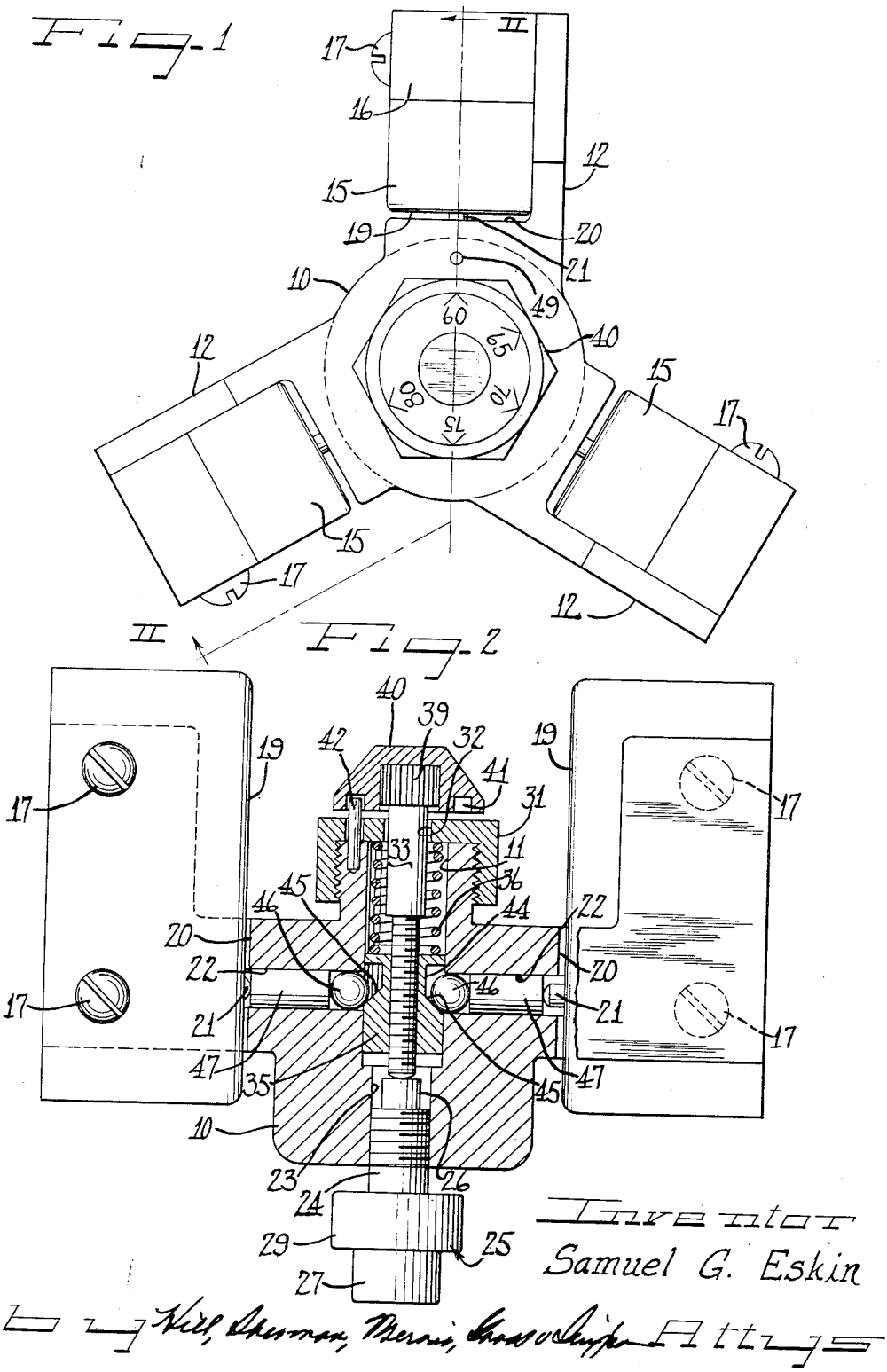
Inventor
Samuel G. Eskin Aug. 7, 1956  S. G. ESKIN  2,758,177
MULTI ACTION ELECTRICAL THERMOSTAT
Filed March 9, 1955  2 Sheets-Sheet 2

Inventor
Samuel G. Eskin
Attys

United States Patent Office 2,758,177
Patented Aug. 7, 1956

2,758,177

MULTIACTION ELECTRICAL THERMOSTAT

Samuel G. Eskin, Chicago, Ill., assignor to The Dole Valve Company, Chicago, Ill., a corporation of Illinois Application March 9, 1955, Serial No. 493,258

6 Claims. (Cl. 200—140)

This invention relates to improvements in electric thermostats and more particularly relates to a multiaction electrical thermostat particularly adapted for air conditioners and the like for automatically controlling operation of the compressor, blower, ducts and air vent in a predetermined sequence.

Heretofore, room air conditioners have been designed to ventilate, cool and ventilate, and cool, and are equipped with a simple thermostat which controls the operation of the compressor only.

In carrying out my invention I provide an improved form of electrical thermostat for automatically controlling the operation of a room air conditioner to effect ventilating only upon certain predetermined room temperatures, cooling and ventilating upon predetermined increases in room temperature and cooling only upon an additional increase in room temperature.

This is attained by utilizing a temperature sensitive element of the solid-fill or wax type having a piston having a relatively long travel and high power, and by locating the thermal element in the return air opening of the air conditioning unit. It is further attained by mounting a plurality of switches, which may be snap action switches on a support body for the thermal element, and by utilizing a cam means movable along the body by the piston of the thermal element to operate the switches at different temperatures, the temperature ranges of operation of which may be adjusted by operation of a single adjusting knob for the thermostat.

In this manner the blower or fan may first come into operation to ventilate the room by circulating fresh air thereinto, the fresh air vent being open at this stage.

Upon a further increase in room temperature, the piston of the thermal element will cause the thermostat to start the compressor, allowing the cooling unit to ventilate and cool by circulating the fresh cooled air into the room. During this cooling and ventilating operation, further movement of the piston of the thermostat may operate still a third switch to close the fresh air vent as required, to effect the re-circulation of cooled room air through the cooling coils of the conditioner.

If the temperature of the outside air should fall to a point where no cooling is required, the room temperature will start to gradually fall, causing the thermostat to turn the compressor off, open the fresh air vent and shut the blower off, all in a sequence, and thus preventing the room temperature from dropping below a selected comfort level.

Furthermore, when the compressor is in operation and the fresh air vent is open, if the relative humidity of the outside air should increase to a point where the evaporator frosts, the resultant increases in room temperature will cause operation of the thermostat to close the fresh air vent, the refrigerating unit then circulating relatively warm room air over the evaporator and causing defrosting thereof.

I further contemplate as another feature of my invention to exhaust air from the room by the room air conditioner under the control of the knob for selecting the temperature of operation of the thermostat, and operated by turning movement of the knob to a certain predetermined position.

It, accordingly, is an object of my present invention to provide a simplified and improved form of multication thermostat particularly adapted to automatically control the operation of air conditioners and the like by the use of the single thermal element operating a series of switches in a predetermnied sequence.

A further object of my invention is to provide a simplified form of multiaction electrical thermostat in which a plurality of angularly disposed switches are sequentially operated by the power element of a single thermostat, to effect a series of operations upon certatin predetermined temperatures rises.

Still another and important object of my invention is to provide a simple and improved form of multiaction electrical thermostat including a plurality of angularly disposed switches, a power or wax type of thermal element for operating said switches in a predetermined sequence, a single knob for varying the temperature range at which the switches operate and a single return spring accommodating reverse operation of the switches and returning of the power member of the thermostat.

Still another object of my invention is to provide a multiaction electrical thermostat particularly adapted for air conditioners and the like in which a plurality of switches are sequentially operated upon predetermined successive temperature rises, the temperature of which is controlled by a single knob, and in which the knob by turning movement thereof operates still another switch for effecting another condition of operation.

These and other objects of my invention will appear from time to time as the following specification proceeds and with reference to accompanying drawings wherein:

Figure 1 is a top plan view of a multiaction electrical thermostat constructed in accordance with my invention;

Figure 2 is a sectional view taken substantially along line II—II of Figure 1;

Figure 3:
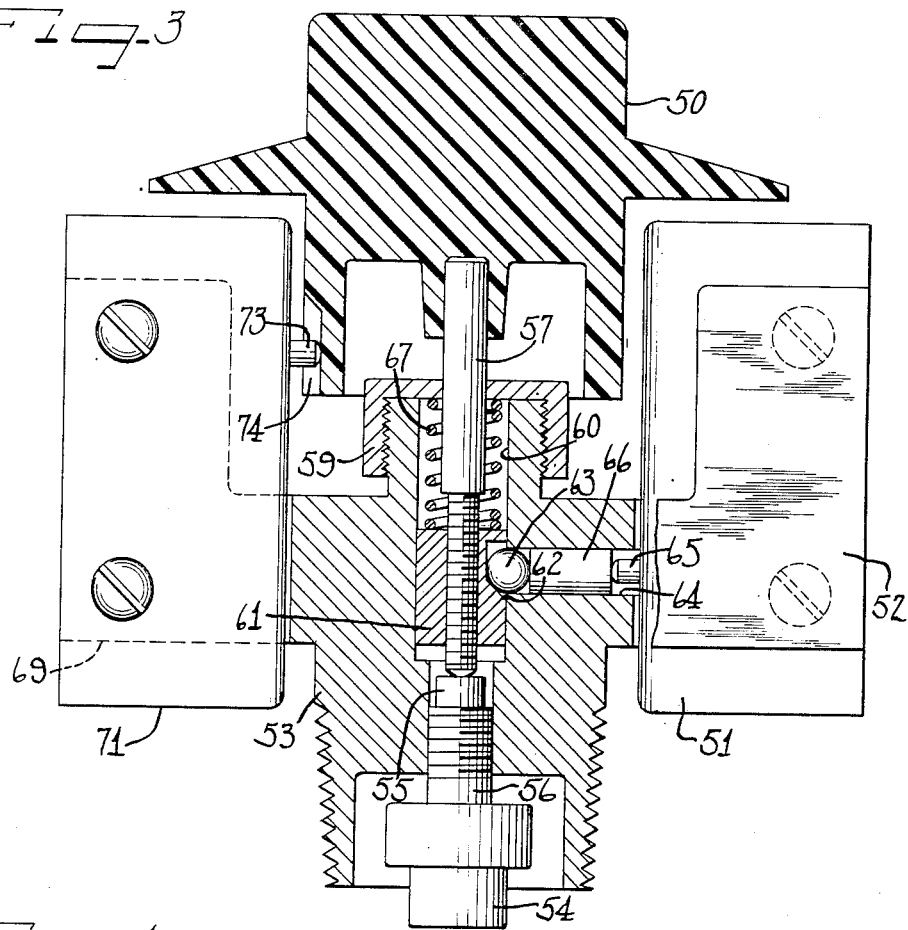
Figure 4:
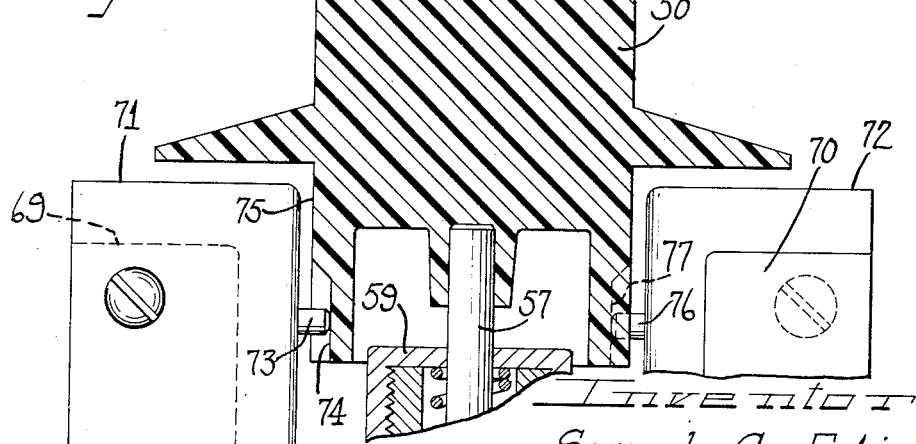

Figure 3 is a fragmentary sectional view illustrating a modified form of my invention in which the knob adjusting the temperature of operation of the thermostat also effects operation of an additional switch manually; and Figure 4 is a fragmentary sectional view of the adjustable thermostat shown in Figure 3, and taken in a different vertical plane, to show the temperature adjustment knob for adjusting the temperature of the thermally operated switches operatively connected with a plurality of switches for manually operating the same upon turning movement of said knob to certain selected positions.

In the embodiment of my invention illustrated in Figures 1 and 2 of the drawings, I have shown a thermostat body 10 having a central passageway 11 leading therethrough and opening to opposite ends thereof. The body 10 is also shown as having three arms 12 extending therefrom in angular spaced relation with respect to each other. Each arm 12 forms a support for a limit or micro switch 15, secured thereto as by machine screws 17.

The switches 15 may be well known forms of single or double throw micro or limit switches so need not herein be shown or described in detail. Each switch 15 is shown as having an inner face 19 facing a wall portion 20 of the thermostat body 10 extending at right angles to the associated arm 12, and as having a depressible operating plunger or button 21 extending within a radial passageway 22 terminating at its inner end in the passageway 11. The plungers 21 may effect operation of the respective switches to make or break a circuit as required.

The passageway 11 leading through the thermostat body 10 is shown as having a reduced diameter portion 23 which is internally threaded for a portion of its length and has a cylinder 24 of the thermal element 25 threaded therein.

The thermal element 25 is shown as being of the so-called power or wax type of thermal element having a power member or piston 26 extensible from the cylinder 24 upon predetermined rise in temperature, and having a casing 27 for a thermally expansible material extending outwardly from the cylinder 24. A conductor ring 29 is shown as surrounding the casing 27 adjacent the cylinder 24. The casing 27 contains a fusible thermally expansible material, which may be a wax alone or a wax and a powdered heat conducting material and binder, such as is shown and described in Patent No. 2,259,846 which issued to Sergius Vernet on October 21, 1941. The thermal element 25 is shown as being the same general type as shown and described in the Vernet Patent No. 2,368,181, dated January 30, 1945, and commonly known as a "Vernay" thermal element. In such elements, the thermally expansible material carried within the casing 27 expands as it reaches its fusion point and acts against a membrane or deformable member (not shown) to extend the piston 26 from the cylinder 24 upon predetermined rises in temperature.

The opposite end of the thermostat body 10 from the thermal element 25 is shown as having an end cap 31 threaded thereon and having a central aperture 32, through which slidably extends a plunger 33, engaging at its inner end the inner end of the piston 26.

The plunger 33 is shown as having a cam member 35 threaded thereon for successively operating the individual switches 15 upon certain predetermined rises in temperature as will hereinafter more clearly appear as this specification proceeds. A compression spring 36 encircling the plunger 33 is interposed between the cam member 35 and the end cap 31 to return the piston or power member 26 within the cylinder 24 upon certain predetermined reductions in temperature, and to return the cam member 35 to a position to accommodate the individual switches 15 to successively open or close depending upon the control conditions required.

The cam member 35 may have a flattened face (not shown) or may have a key way (not shown) to hold said cam member from rotation and effect rectilinear movement of said cam member along the passageway 11 with respect to the power member 26, to adjust the operating range of the thermostat. It should here be understood that the greater the movement of the cam member 35 and piston 26 required to operate the respective switches the higher will be the temperature at which the switches are operated.

The outer end of the plunger 33 is shown as having a longitudinally serrated head 39 having a knob 40 mounted thereon for turning the same to vary the position of the cam member 35 along the passageway 11 and the operating range of the thermostat. As herein shown, the knob 40 has a downwardly opening semi-annular groove 41 extending partially therearound and engaged by a pin 42 extending through the end cap 31, and carried in the body 10 for limiting turning movement of the knob 40 in an extreme temperature adjustment position of the thermal element, and thus preventing movement of the cam member 35 beyond the range of operation of the thermostat by the plungers 21 of the switches 15.

The cam member 35 is shown as having three camming recesses 44 therein, each being spaced 120° apart and registering with a passageway 22, and each having a sloping cam face 45 engageable with a ball 46 in the passageway 22. Interposed between the ball 46 and the plunger or push button 21 is a cylindrical spacer or plunger 47 movable along the passageway 22, to depress an associated push button 21 as the ball 46 moves upwardly along the sloping cam face 45.

The sloping cam faces 45 are spaced axially along the cam member 35 in accordance with the desired temperature range of operation of the respective switches, to effect the successive engagement of the balls 46 with the respective cam faces and the depression of the associated push buttons and operation of the associated switches in a predetermined sequence and at predetermined temperatures, dependent upon the axial spacing of said cam faces along the cam member 35.

The three cam faces 45 may thus be spaced axially along the cam member 35 at predetermined distances in accordance with the travel of the piston or power member 26, as the temperature rises, so as to effect closing of one switch at one temperature condition, to bring a device to be operated into operation, which device may be the blower of an air conditioner, and then effect operation of a second switch at a higher temperature condition to bring another device into operation, which may be the compressor of an air conditioner, upon a predetermined additional travel of the power member 26, and to effect operation of a third switch 15 at a still higher temperature condition to bring another device into operation, which may effect closing of the vent to the outside air upon a still further travel of the power member 26, at a still higher temperature range.

The outer face of the knob 40 is shown as being calibrated for operation in a temperature range between 60 and 80° F., the temperature range of adjustment of the thermostat being at the point where the temperature indicia on the knob corresponds with an indicating dot 49 on the upper face of the body 10.

In the form of my invention illustrated in Figures 3 and 4, I have shown a combined manually operable and thermostatically operable switching device operated by a single knob 50, which also serves to adjust the temperature range of operation of a thermostatically operated switch 51, carried on an arm 52 projecting from a thermostat body 53, which may be somewhat similar to the thermostat body 10 shown in Figures 1 and 2.

The thermostat body 53 is shown as having a thermal element 54 threaded in one end thereof and having a piston 55 extensible from a cylinder 56 of the thermal element, as in the form of my invention illustrated in Figures 1 and 2. The piston 55 is engageable with the inner end of a plunger 57, slidably guided in an end cap 59 for the body 53 and closing a passageway 60 extending along said body, into which the plunger 57 and piston or power member 55 extends. The plunger 57 has the knob 50 secured to the outer end thereof, for turning the same and adjusting the temperature range of operation of the switch 51. A cam member 61 is shown as being threaded on the plunger 57 and as having a sloping cam face 62 engageable with a ball 63 in a radial passageway 64. A plunger 65 of the switch 51 also extends within the radial passageway 64 as in the form of my invention shown in Figures 1 and 2, and abuts a spacer cylinder 66 for depressing the plunger 65 upon movement of ball 63 along the sloping cam face 62, as the piston 55 is extended from the cylinder 56 upon predetermined rises in temperature. A compression spring 67 encircling the plunger 57 and interposed between the cap 59 and cam member 61 is provided to serve as a return spring for the power member 55.

Also carried on the thermostat body 53 on arms 69 and 70 thereof, are two manually operable switches 71 and 72. The switches 71 and 72 like the switch 51 and the switches 15 may be well known forms of snap action micro-switches of a form well known to those skilled in the art, so not herein shown or described in detail. The switch 71 is shown as having a depressible operating button or plunger 73 engageable within a camming recess 74 formed in a cylindrical wall 75 of the knob 50. The switch 72 is likewise shown as having a depressible plunger or push button 76 engageable within a camming recess 77 formed in the cylindrical wall 75 of the knob 50.

Thus, upon turning movement of the knob 50 in one direction from the off position of the thermostat, the push button 73 may be depressed to complete a circuit to a device to be operated such as the blower or fan of an air conditioner. Upon turning movement of the knob 50 in an opposite direction from the off position of the thermostat, the button 76 may be depressed to close the switch 72 and effect the exhaust of air from a room.

Further, upon turning movement of the knob 50 in a direction to set the thermostat and upon a rise in the room temperature to effect extension of the power member or plunger 55 from the cylinder 56, the cam member 61 will be moved along the passage 60 to engage the sloping cam face 62 with the follower roller 63 and effect depression of the push button or plunger 65 to operate the switch 51 at the temperature setting of the thermostat, effected by turning movement of the knob 50 to the required position. The temperature setting of the thermostat and the temperature a which the switch 51 will be operated is dependent upon the length of travel of the sloping cam face 62 of the cam member 61 along the passageway 60 necessary to depress the follower roller 63 to operate the plunger 65 and switch 51. Thus the longer the travel of the cam face 62 required to operate the switch 51 the higher will be the temperature at which said switch operates.

It should here be understood that if desired any number of thermostatically operated switches may be provided as in the form of my invention illustrated in Figures 1 and 2, and that the manually operated switches may be located between the thermostatically operated switches where desired or necessary to effect a variety of operations thermostatically and manually under the control of a single control knob.

It will be understood that modifications and variations of the present invention may be effected without departing from the spirit and scope of the novel concepts thereof.

I claim as my invention:

1. In a multi-action electrical thermostat, a support body, a plurality of angularly disposed switches supported on said body, each being adapted to control a separate operation, a thermal element carried by said body and having an extensible power member extensible within said body, operating means for said switches movable radially with respect to the longitudinal axis of said power member, and a cam member movable along said body by said power member and having angularly disposed cam faces spaced axially with respect to each other for sequentially operating said switches upon predetermined temperature rises.

2. In a multi-action electrical thermostat, a support body, a plurality of angularly disposed switches carried thereby, each being adapted to control a separate operation at predetermined different temperature conditions, a thermal element secured to said body and having a power member extensible therealong, operating means for said switches movable at right angles to the path of movement of said power member, a cam member movable along said body upon extensible movement of said power member, a spring within said body engageable with said cam member and returning said power member upon predetermined reductions in temperature, said cam member having a plurality of angularly disposed cam faces, each being associated with an operating means for an associated switch and being spaced axially along said cam member in accordance with the required temperature of operated of the associated switch, for operating said switches in a predetermined sequence dependent upon certain predetermined rises in temperature.

3. In a combined manually and thermostatically operable switching device, a body having a plurality of switches carried thereby and spaced angularly thereabout, a thermal element carried by said body and having a power member extensible along said body upon predetermined increases in temperature, a cam member movable along said body by said thermal element and having at least one sloping cam face, a follower member operated by said sloping cam face upon movement of said cam member along said body for operating one of said switches, means for adjusting the position of said cam member along said body to vary the operating range of the thermal element, and a knob for operating said adjusting means and having a cam face thereon for manually operating another of said switches.

4. In a multi-action electrical thermostat for air conditioners and the like particularly adapted to automatically operate a blower, compressor and air vents in a predetermined sequence dependent upon different temperature conditions, a body having a central passageway therein, a plurality of switches mounted on said body in angularly spaced relation with respect to each other and each having a depressible operating member extending radially with respect to the axis of said passageway, a thermal element carried by said body and having a casing on the outside thereof and a power member extensible along said passageway upon predetermined increases in temperature, and a cam member in axial alignment with said power member and moved thereby along said passageway upon extensible movement of said power member therealong, said cam member having an individual cam face for each switch spaced axially therealong and engageable with an individual switch operating member, for sequentially operating said switches upon predetermined temperature conditions.

5. In a multi-action electrical thermostat particularly adapted for air conditioners and the like for automatically operating the blower, compressor and controlling the air vents thereof in a predetermined sequence, a body having a central passageway extending therealong, a plurality of switches mounted on said body in angularly spaced relation with respect to each other, each having a radially extending operating button extending within said body, a thermal element carried by said body comprising a casing on the outside thereof, a cylinder extending inwardly from said casing and a piston extensible from said cylinder upon predetermined temperature rises, a plunger engageable with said piston, a cam member adjustably carried by said plunger and having a plurality of radially disposed axially spaced cam faces, each being associated with a respective switch button for operating the same upon predetermined temperature conditions, a spring in said passageway engageable with said cam member for returning said cam member and said power member upon predetermined reductions in temperature, and a knob on said plunger for adjusting the position of said cam member with respect thereto and the operating range of said thermostat.

6. In a multi-action electrical thermostat particularly adapted for air conditioning and the like for automatically operating the blower, compressor and air vents in a predetermined sequence, a body having a central passageway extending therealong, a thermal element closing one end of said passageway and having a power member extensible along said passageway upon certain predetermined rises in temperature, a plurality of radial passageways intersecting said central passageway, a switch associated with each radial passageway and having an operating button extending therein, an operating member for said button in each radial passageway, a cam member in axial alignment with said power member and moved thereby along said central passageway upon predetermined temperature rises, spring means for retractibly moving said power member, and angular drive connections from said cam member to said operating members, spaced along said cam member in angular and radial spaced relation with respect to each other for sequentially operating said switches upon extensible and retractible movement of said power member.

References Cited in the file of this patent

UNITED STATES PATENTS

| | | |
|---|---|---|
| 1,667,056 | Smith | Apr. 24, 1928 |
| 2,355,975 | Henrici | Aug. 15, 1944 |
| 2,506,623 | Williams | May 9, 1950 |
| 2,591,803 | Garner | Apr. 8, 1952 |